March 10, 1964 N. J. ASMAN Re. 25,532

DISPENSING CARTON

Original Filed Dec. 1, 1960 2 Sheets-Sheet 1

INVENTOR.
NORMAN J. ASMAN
BY George F. Verhoff
Joseph Rosenbaum
ATTORNEYS

DISPENSING CARTON

Original Filed Dec. 1, 1960 2 Sheets-Sheet 2

INVENTOR.
NORMAN J. ASMAN
BY George S. Verhage
Joseph Rosman
ATTORNEYS

United States Patent Office

Re. 25,532
Reissued Mar. 10, 1964

25,532
DISPENSING CARTON

Norman J. Asman, Appleton, Wis., assignor to American Can Company, New York, N.Y., a corporation of New Jersey Original No. 3,002,673, dated Oct. 3, 1961, Ser. No. 73,060, Dec. 1, 1960. Application for reissue Sept. 25, 1963, Ser. No. 311,604
3 Claims. (Cl. 229—17)

Matter enclosed in heavy brackets [ ] appears in the original patent but forms no part of this reissue specification; matter printed in italics indicates the additions made by reissue.

This invention relates to a dispensing container with an extensible, reclosable pouring spout, suitable for a variety of uses such as the packaging of granular, flaked and powdered products. More specifically, the invention may with particular advantage be used as a carton for packaging soap powder or breakfast cereals.

Further details and advantages will be apparent from the following specification and appended drawings wherein.

Figure 1:
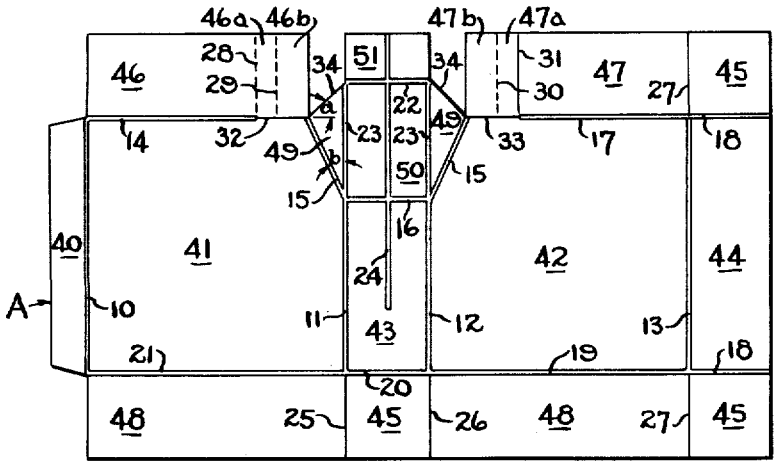
FIGURE 1 is a plan view of an integral blank suitably cut and scored to form a dispensing carton.

Referring first to FIGURE 1, the carton is made of a single foldable blank A of flexible material such as paperboard. The blank A is divided by score lines 10—23, cut lines 25—27 and cut-score lines 32, 33 into hingedly connected panels and flaps, including glue flap 40, main panels 41 and 42, side panels 43 and 44, dust flaps 45, end closure flaps 46—48, spout side panels 49, spout front panel 50 and spout tab 51.

End closure flaps 46 and 47 have lines of weakening impressed therein, such as perforation lines 28—30 and cut-score line 31 which may or may not, as desired, terminate short of the edges of flap 47. These lines provide marginal portions 46a, 46b, 47a and 47b, which facilitate opening the spout of the closed set-up carton, as will be described in detail later herein.

The blank A is formed into a glued carton shell by folding flap 40 and panel 41 about score line 11 to overlie panels 43 and 42, applying adhesive to the exposed surface of flap 40, and then folding panel 44 about score line 13 to overlie the adhesive surface of flap 40 and become adhered thereto. In such condition, the shell economically may be shipped to the product packager for set-up, filling and closing.

Figure 2:
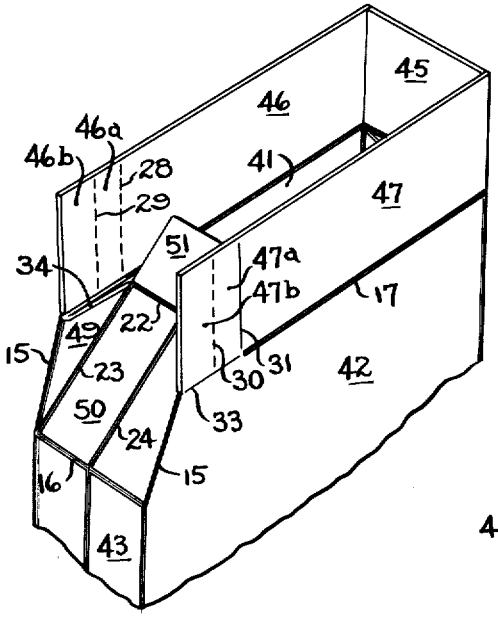
FIGURE 2 is a perspective view, partially cut away, of the blank of FIGURE 1 partially set up and glued to form a carton shell.

FIGURE 2 depicts an initial stage in closing the top of the carton. In forming the carton from the glued shell previously described, the shell is squared to position the panels 41, 43, 42 and 44 consecutively at right angles to each other. Spout front panel 50 hingedly connected along terminating score line 16 is pressed inwardly so that spout side panels 49 lie in superposed relationship with and inwardly of main panels 41 and 42. As shown in FIGURE 2, spout front panel 50 lies inwardly of score lines 15 and is hingedly attached to the spout side panels 49 along score lines 23 and to side panel 43 along score line 16.

Figure 3:
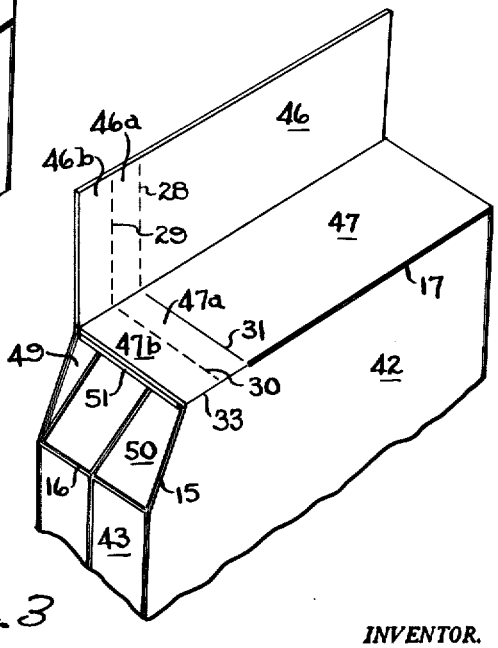
FIGURE 3 is a perspective view, similar to FIGURE 2, showing a further stage in forming the completed carton.
Figure 4:
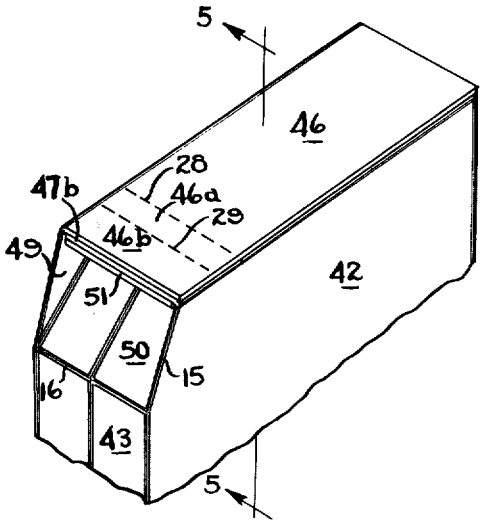
FIGURE 4 is a perspective view, partially cut away, of the completed carton.
Figure 5:
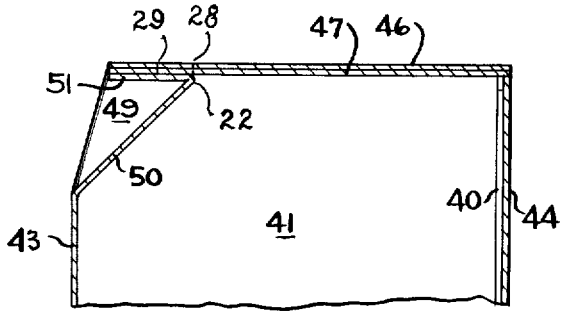
FIGURE 5 is a cross-sectional view of the completed carton, taken along the line 5—5 of FIGURE 4.

Spout tab 51 is then folded outwardly along score line 22 to lie parallel to the top edges of main panels 41, 42 as defined by score lines 14 and 17, and dust flap 45 is folded inwardly along score line 18 to lie parallel to the top edges of the main panels. An adhesive is applied to the exposed upper surface of flap 45 and to the inside of marginal portion 47b, and end closure flap 47 is then folded inwardly in superposed relationship on spout tab 51 and dust flap 45 and is adhered thereto, as shown in FIGURE 3. Closure of the top of the carton is completed by applying adhesive to the exposed upper surface of flap 47, and folding flap 46 over in adhering relation therewith. The completed top closure thus formed is shown in FIGURES 4 and 5.

The carton, having the top closed as just described, may then be filled with the product to be packaged by pouring or otherwise inserting the product through the unclosed bottom of the carton. The bottom may then be closed conventionally, by consecutively infolding flaps 45 and 48, with the one flap 48 superposed over and adhered to the other flap 48.

Figure 6:
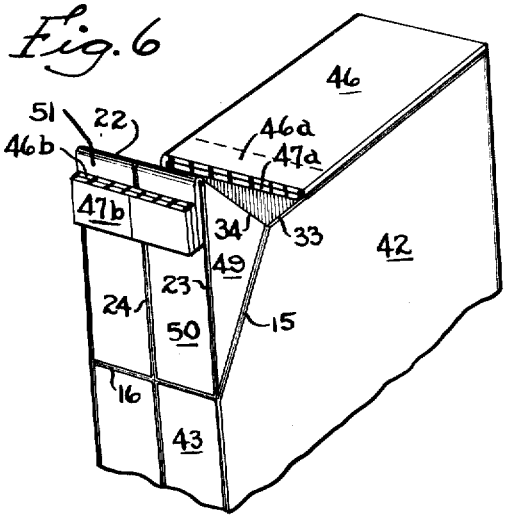
FIGURE 6 is a perspective view, partially cut away, of the carton with the dispensing spout extended for pouring of the contained product.

Referring also to FIGURE 6, in opening the carton the spout tab 51 and the glued portions 46a, 46b, 47a and 47b of the end closure flaps overlying it are pulled upward, causing a tearing action along cut-score lines 32 and 33, terminating at perforation line 28, and cut-score line 31. The spout tab 51 and the overlying glued portions 46b and 47b of the end closure flaps are then pulled outwardly away from perforation lines 28 and 29. This causes a tearing action along perforation lines 29 and 30 leaving portions 46b and 47b of the glued end closure flaps attached to the spout tab and free from the remainder of the end closure flaps. Tearing action occurs along perforation lines 29 and 30 rather than along perforation line 28 and cut-score line 31 since the bond is weaker along the first mentioned lines. The spout may then be fully extended, with the spout front panel 50 lying in a line with side panel 43, as shown in FIGURE 6. Spout side panels 49 provide a toggle action which tends to maintain the spout in open or extended position. The spout tab 51 can then be folded down outwardly to lie superposed on the spout front panel. Pressing the spout side panels 49 toward each other forces the spout front panel 50 to bend outwardly along score line 24, contributing further to the formation of a spout-like construction and thus facilitating pouring of the contents from the carton. Portions 46a and 47a of the end closure flaps overlie the edges 32 and 33 of the main panels. These portions serve to restrict the size of the pouring or dispensing opening and to help close the opening when the spout is reclosed as described later herein.

The carton is reclosed by releasing the pressure on spout side panels 49, lifting spout tab 51 until it is essentially perpendicular to the spout front panel 50 and pressing inwardly on the center of spout front panel 50. When the spout is partially closed, the toggle action of spout side panels 49 completes the closure and maintains the spout in recessed position making the carton substantially siftproof and appearing essentially as shown in FIGURE 4.

In order to insure formation of a tight spout seal when the top closure is formed and proper tearing action in opening the carton and to provide a substantially siftproof reclosure of the pouring spout, several elements of the carton design are critical. In the closed carton the upper edge of the spout front as defined by score line 22 should extend to the intersection of perforated line 28 and partial cut line 31 with the top edges of the main panels 41, 42 defined by score lines 14 and 17, respectively. In order to obtain this relationship, and also have the spout front panel 50 co-planar with side panel 43 when the spout is fully extended, a particular relationship between the angles in the spout side panels must be employed. As shown in FIGURE 1, the angle formed by score lines 23 (comprising extensions of score lines 11 and 12, respectively) and 15 is indicated by "b" and the angle between the upper edges 34 of the spout side panels 49 and an extension of top edges 14, 17 of main panels 41 and 42 respectively is denoted by "a." With the spout closed, the angle formed by spout front panel 50 with an extension of side panel 43, i.e. the angle formed by a plane containing score lines 23 and a plane containing extensions of score lines 11 and 12, consequently will be 2b.

The required relationship necessary between angles "a" and "b" can be determined by the use of similar triangles and opposite triangles. If in the blank of FIGURE 1, the angle formed by the intersection of edge 34 and score line 15 were a right angle, and assuming the desired relationship of score line 14 perpendicular to score line 23, then the triangle formed by edge 34, score line 23 and an extension of score line 14 would be similar to the triangle formed by score lines 15 and 23 and an extension of score line 14. Then the angle formed by edge 34 and extension of score line 14 would be the same as the angle formed by score lines 15 and 23, namely "b." If spout side panel 49 were then folded along score line 15 to lie superposed on main panel 41, the angle formed by edge 34 and cut score line 32 would be equal to the angle formed by edge 34 and an extension of score line 14 in the original carton blank, and also equal to the angle "b," because they are opposite angles. This means that in order for edge 34 to coincide with edge 32 when spout side panel 49 is folded in to lie superposed on main panel 41, the angle formed by edge 34 and an extension of score line 14 shown as "a" must be increased by the angle formed when the spout side panel is infolded, namely "b." Therefore, since by similar triangles, the angle formed by edge 34 and an extension of score line 14 is equal to "b" and by the use of opposite angles an angle equal to "b" must be added, angle "a" is equal to 2b when the desired relationship is obtained. The use of the particular angles aforementioned insures the desired relationship of the spout when in opened and closed positions. A suitable set of angles would be 22° 30′ for "b" and 45° for "a" although other pairs of angles may be employed i,e. 30° and 60°. Based on interrelated considerations such as the amount of board used in the carton, the size of the opening, and ease of opening and reclosing the carton, the use of 22° 30′ and 45° angles is preferred. Obviously since both sides of the spout are identical in construction the aforementioned relationship holds true for either side.

If the carton is to be emptied at the time it is first opened, the provision for siftproofness of reclosure is unnecessary. For such simplified construction, the portions 46a, 46b, 47a and 47b of the end closure flaps may be integrally glued together and to tab 51, so that the tearing of the end closure flaps takes place at perforation line 28 and cut-score line 31, thereby providing a larger dispensing opening.

The present invention provides a carton construction incorporating a convenient pour spout which requires a minimum of paperboard stock. The carton can be readily set up, filled with the commodity to be packaged and sealed, by automatic machinery. The carton has ample strength to withstand shipping and handling without leakage or premature opening, and the design of the spout opening is such that the spout readily assumes its original position upon closing. Any conventional end closure means such as that illustrated and described, may be employed on the end of the carton opposite the spout, as those means do not constitute an inventive feature. It is to be understood that the size and shape of the carton and the material from which it is formed may be varied in numerous ways by those skilled in the art without departing from the spirit of the invention.

I claim:

1. A reclosable dispensing carton formed of a single blank suitably cut and scored to provide a pair of opposed main panels, each of said panels having one of a pair of opposed edge-defining biased score lines extending from a lateral to a top edge near one corner thereof; a pair of opposed side panels hingedly connected to the lateral edges of said main panels, one of said side panels terminating in a score line at the point where said biased score lines intersect said lateral edges; a pair of bottom closure flaps hingedly connected to adjacent ends of said main panels; a pair of top closure flaps hingedly connected to adjacent ends of said main panels and terminating at the intersection of said biased score lines with said top edges, a spout front panel hingedly connected to said one side panel along said terminating score line; a pair of opposed triangular spout side panels each being superposed against and between said main panels and each hingedly connected along one edge to the edge of one of said main panels along said biased score lines, and hingedly connected along another edge to said spout front panel, the third edge of each spout side panel being positioned along the top edge of one of said main panels; a spout tab hingedly connected to the upper edge of said spout front panel and lying in subposed relationship under and adhered to one of said top closure flaps and extending approximately to the upper termini of said biased score lines; said spout front panel forming an angle with an extension of said one side panel twice that of the angle formed by said biased score lines and said extension; and lines of weakness in said top closure flaps and along the score lines connecting said top closure flaps and said main panels to facilitate tearing to open the spout; said spout in opened position having said spout front panel and spout side panels lying coplanarly with said one side panel and said main panels respectively.

2. A unitary carton blank adapted to be formed into a dispensing carton with an extensible, reclosable spout, said blank being suitably cut and scored to form a pair of main panels each defined by a pair of longitudinal, parallel, spaced score lines, a pair of transverse, parallel, spaced score lines and at one end of each main panel near adjacent corners an edge defining biased score line running from one of said longitudinal score lines to one of said transverse score lines; two pairs of end closure flaps, the first pair of which is hingedly attached along said transverse score lines to said one end of said main panels and terminating at the point where said biased score lines intersect said one transverse score lines, the second pair of which is hingedly attached along the other transverse score lines to the other end of said main panels; a connecting side panel hingedly attached to adjacent edges of said main panels along said one longitudinal score lines and terminating in a score line at the point where said biased score lines intersect said longitudinal score lines; a spout front panel hingedly attached along said terminating score line to said connecting side panel; a spout tab hingedly connected by a score line to the edge of said spout front panel opposite said terminating score line; a pair of triangular spout side panels hingedly connected on one edge to said main panels along said biased score lines and along another edge to said spout front panel by score lines which are extensions of said one longitudinal score lines, and the remaining edge extending from the score line connecting said spout tab to said spout front panel to the intersection of said biased score lines with said one transverse score lines, each such remaining edge forming an angle with an extension of said one transverse score line that is equal to twice the angle formed by said biased score lines and an extension of said one longitudinal score lines; a second side panel hingedly attached to one of said main panels along the other longitudinal score line thereof; said one transverse score lines and said first pair of end closure flaps having suitable lines of weakness to facilitate tearing to open the carton when completed.

*3. A reclosable dispensing carton formed of a single blank suitably cut and scored to provide a pair of opposed main panels, each of said panels having one of a pair of opposed edge-defining biased score lines extending from a lateral to a top edge near one corner thereof; a pair of opposed side panels hingedly connected to the lateral edges of said main panels, one of said side panels terminating in a score line at the point where said biased score lines intersect said lateral edges; a pair of bottom closure flaps hingedly connected to adjacent ends of said main panels; a pair of top closure flaps hingedly connected to adjacent ends of said main panels, a spout front panel hingedly connected to said one side panel along said terminating score line; a pair of opposed spout side panels each being superposed against and between said main panels and each hingedly connected along one edge to the edge of one of said main panels along said biased score lines, and hingedly connected along another edge to said spout front panel, and having a third edge of each spout side panel positioned adjacent one of said top closure flaps; a spout tab hingedly connected to the upper edge of said spout front panel and lying in subposed relationship under and adhered to one of said top closure flaps and extending approximately to the upper termini of said biased score lines; said spout front panel forming an angle with an extension of said one side panel twice that of the angle formed by said biased score lines and said extension; and lines of weakness in said top closure flaps and along the score lines connecting said top closure flaps and said main panels to facilitate tearing to open the spout; said spout in opened position having said spout front panel and spout side panels lying coplanarly with said one side panel and said main panels respectively.*

References Cited in the file of this patent or the original patent

UNITED STATES PATENTS

| | | |
|---|---|---|
| 1,697,664 | Schweich | Jan. 1, 1929 |
| 2,616,610 | Tomarin | Nov. 4, 1952 |
| 2,730,289 | Dixon | Jan. 10, 1956 |
| 2,789,747 | Graybill | Apr. 23, 1957 |